Aug. 31, 1937.  R. C. HOBSON  2,091,853
CAR TRUCK
Filed March 23, 1934   5 Sheets-Sheet 3

INVENTOR:
Roy C. Hobson
BY Clarence D Kerr
his ATTORNEY

Aug. 31, 1937.  R. C. HOBSON  2,091,853
CAR TRUCK
Filed March 23, 1934  5 Sheets-Sheet 4

INVENTOR:
Roy C. Hobson
BY
Clarence D Kerr
his ATTORNEY

Patented Aug. 31, 1937

2,091,853

UNITED STATES PATENT OFFICE 2,091,853

CAR TRUCK

Roy C. Hobson, Cleveland Heights, Ohio, assignor to National Malleable and Steel Castings Company, Cleveland, Ohio, a corporation of Ohio Application March 23, 1934, Serial No. 716,948

32 Claims. (Cl. 105—197)

This invention relates to railway car trucks. One of its objects comprises novel bolster-supporting provisions whereby loads or forces are transmitted from the bolster to the side frames in a particularly advantageous manner, with drastic reduction in bending moments and secondary bending stresses in the tension and compression portions and columns of the side frames. The invention further provides new and highly effective means for damping oscillations of the bolster-supporting springs. A further feature of the invention resides in provisions for transmitting bolster-supporting spring stresses to the sides of the bolster for snubbing or damping spring oscillations. The invention also enables wheel change or disassembly of the truck to be accomplished with marked facility, permits a substantial saving in weight, and provides effectively for squaring of the side frames with respect to the bolster in response to departure of said side frames from such relation, as in rounding curves. The foregoing advantages, moreover, are attained without requiring any change in construction of the conventional American Railway Association bolsters. Other features and advantages of the invention will be hereinafter described and claimed.

Figure 1:
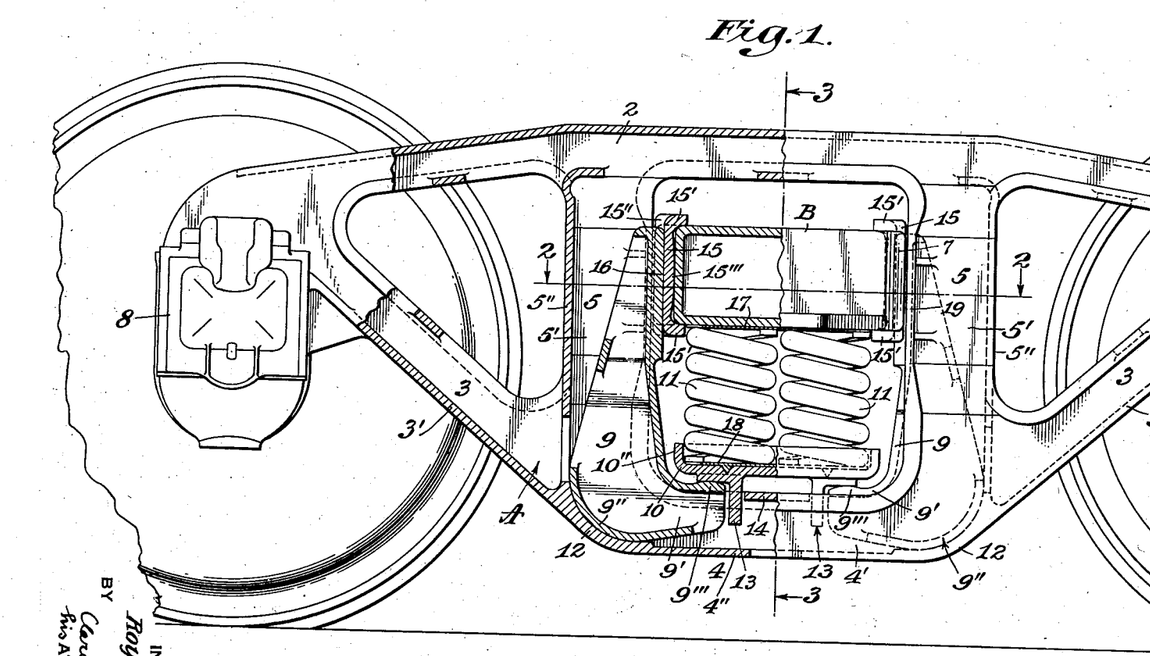
Fig. 1 is a view partly in side elevation and partly in vertical section, showing a portion of a car truck embodying my invention.

Referring to the drawings, there is shown in Fig. 1 a car truck side frame A comprising a compression member 2, inclined tension members 3, 3, a lower horizontal tension portion 4, and columns 5, 5 joining the compression member 2 and tension portion 4, and providing a bolster-receiving opening or window therebetween. The bolster B extends at one end into said opening. It will be understood that the car truck also includes a similar side frame into which the opposite end of the bolster projects, but a description of one side frame and its cooperation with the bolster is sufficient for an understanding of my invention. The bolster B is of the conventional American Railway Association type having pairs of lugs 6, 6 and 7, 7 at each end thereof, adapted to cooperate with opposite sides of the columns of the conventional A. R. A. side frame when such frame is employed with the bolster, as is well understood. At its opposite ends the side frame A cooperates with journal boxes for the truck wheel axles in the customary manner, one of said journal boxes being indicated at 8.

In carrying out my invention I provide a pair of rocker members in the form of bell crank levers 9, 9, the short horizontal arms 9' of which underlie a seat member 10 which carries the bolster supporting springs 11. Each of the rockers 9 is pivotally mounted in the side frame through the medium of intermediate curved portion 9'' of the rocker, which seats in a correspondingly curved portion 12 of the side frame. Each curved portion 12 aforesaid is shown below a corresponding one of the columns 5 and in the region wherein the horizontal tension portion 4 merges with an adjacent tension member 3. The columns 5 are channel shaped in cross section, as shown particularly in Fig. 2, and the long arms of the rockers 9 extend through the open sides of said columns into the bolster receiving opening. The short arms 9' project upwardly through the open side of the tension portion 4, for engagement with the spring seat 10. The latter rests upon portions 9''' of the arms 9', said portions 9''' being curved or crowned, as shown, to enable the rockers and spring seat to engage at substantially the same point regardless of variations in the rocker and spring seat castings arising in the manufacture thereof.

Figure 2:
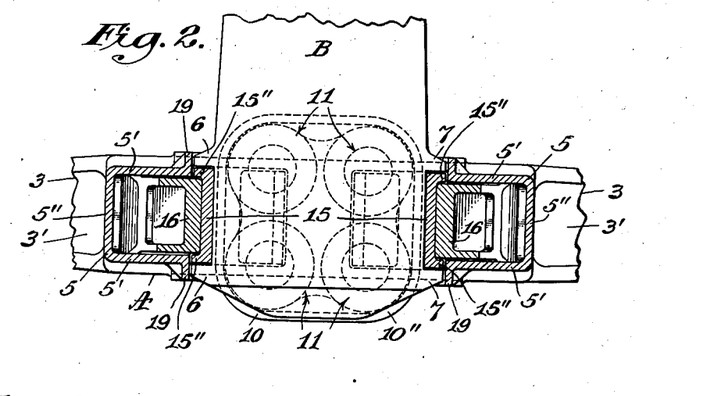
Fig. 2 is a horizontal sectional view taken on line 2—2 of Fig. 1, the bolster being shown in plan.
Figure 3:
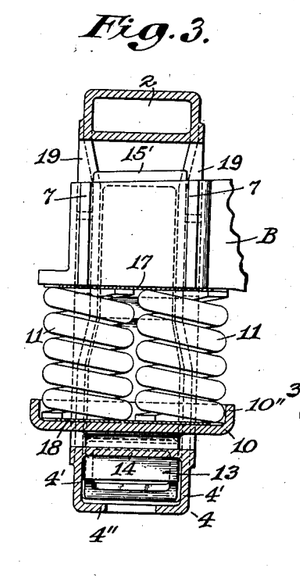
Fig. 3 is a vertical sectional view taken on line 3—3 of Fig. 1, the bolster being shown in side elevation.

The sides 5', 5' of each of the channel shaped columns 5 merge at their upper ends with the side walls of the channel shaped compression member 2, and at their bottoms with the side walls 4', 4' of the horizontal tension member 4, said sides 5', 5' also merging with the side walls of the adjacent channel shaped and inclined tension member 3. Also the back wall 5" of each of said columns 5 extends downwardly from the compression member 2, and merges with the bottom wall 3' of the adjacent tension member 3, as well as with the adjacent curved wall 12, which forms an end portion of the bottom wall 4" of the horizontal tension member 4.

The spring seat 10 has projections 13, 13 depending therefrom into the space within the side frame tension portion 4. Between these projections is a web 14 integral with said tension portion 4 and extending across the top thereof, from one side wall to the other. Said web, in cooperation with the spring seat projections 13, 13, maintains said spring seat in properly centered relation in the side frame window opening.

The upper portion of the long arm of each rocker 9 may engage directly a side wall of the bolster but preferably, as shown, wear plates 15, 15 are interposed between said bolster and the respective rockers. Each wear plate 15 is mounted between a corresponding pair of bolster lugs 6, 6 or 7, 7, and is provided with flanges 15', 15' engaging the top and bottom of the bolster. The portion of each rocker arm which engages the associated wear plate 15 is preferably thickened as shown at 16 and is received between side flanges 15", 15" of said wear plate.

A spring plate 17 may be interposed between the bolster and the tops of the springs 11, while a plate 18 is shown between the bottoms of said springs and the seat member 10. An upwardly extending peripheral flange 10" on said seat member surrounds said springs and maintains them in position on said member 10.

From the foregoing description it will be seen that the forces imparted by the bolster to the springs 11 upon which said bolster rests, are transmitted through the seat member 10 to the rockers 9, 9, and that through the frictional engagement between the long arms of said rockers and the plates 15, 15 at the bolster sides, oscillations of the springs are quickly snubbed or damped. My construction thus provides effectively for the prevention of undesirable harmonic oscillations of the bolster supporting springs, which oscillations frequently endanger the car and its lading. The frictional engagement between said rockers and wear plates furthermore aids the springs in cushioning heavy shocks, in addition to dampening oscillations and preventing sudden spring recoil.

It will further be observed that through the provision of the rockers 9 the bolster is enabled to move vertically without rubbing against the side frame columns. Wear between the bolster and side frame is thus reduced to a minimum. The wear plates 15 and rockers 9 may be of any appropriate wear-resistant metal, such as any steel having substantial wear-resisting properties.

Each of the side frame columns 5 is shown provided with flanges 19 extending laterally from opposite sides thereof. These flanges project into position for receiving accelerating or braking thrusts from the bolster lugs 6, 6 or 7, 7. In addition, the flanges 15" of the wear plates transmit thrusts of the type aforesaid to the side frame columns, said flanges 15" thus increasing the area for the transmission of such stresses to the side frame.

The inner surface of each wear plate is preferably curved slightly vertically, as shown at 15''', assuring an extended bearing between the outer surface of the wear plate and the associated rocker arm despite variations in the adjacent surfaces of the wear plate and bolster.

Figure 4:
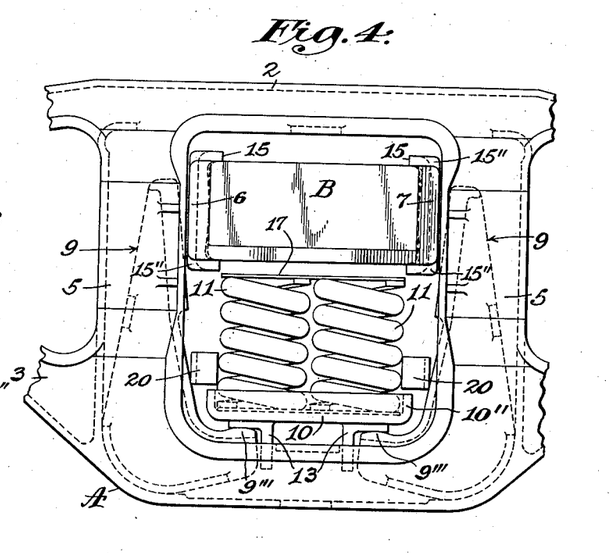
Fig. 4 is a fragmentary side elevational view illustrating a mode of disengagement of the snubbing levers from the bolster, preparatory to disassembly of the truck.

Since the wear plates are mounted between the respective pairs of bolster lugs 6, 6 and 7, 7, and each rocker 9 in turn extends between the flanges 15" of the associated wear plate, it will be seen that through said lugs, flanges, and rockers, the bolster is maintained in assembled relation to the side frames. Disassembly of the truck for wheel change purposes or otherwise may at the same time be accomplished expeditiously as follows:

The bolster is raised slightly into a position such as shown in Fig. 4, and is held in that position by suitable blocking. Wedges 20 are then inserted between the rockers 9 and the adjacent springs 11, throwing said rockers outwardly clear of the wear plate flanges 15". Then, following removal of the journal box wedges and brasses in the customary manner, the side frame can be readily slipped off the bolster. It may be noted in this connection that the upper part of the bolster receiving opening in the side frame A herein disclosed is wider than that of the conventional A. R. A. side frame, and that the bolster lugs 6, 6 and 7, 7 do not overlie the sides of the frame adjacent said opening. Instead, said lugs lie entirely between the side frame columns 5. The side frame may thus be freely moved sideways to clear the bolster.

The clearance between the bottom of the spring seat 10 and the top of the horizontal tension member is ample to require very substantial and prolonged wearing away of the wear plates 15 before said spring seat engages said tension member.

Figure 5:
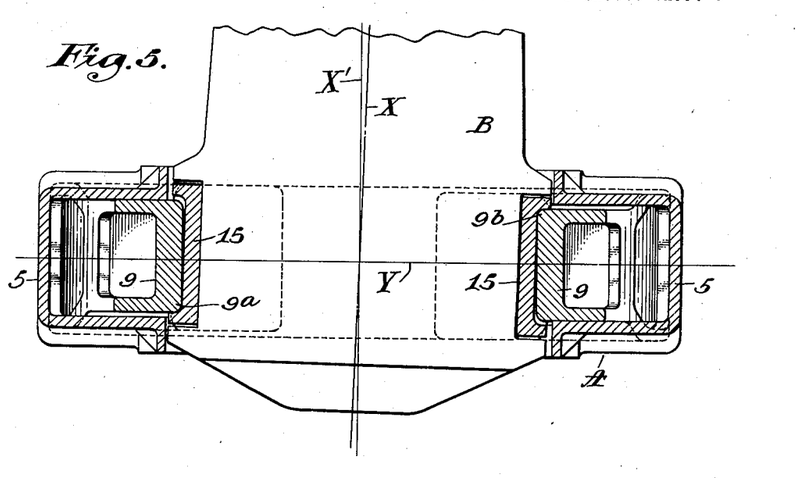
Fig. 5 is a horizontal sectional view with the bolster in plan, illustrating the squaring action upon a side frame.

As is illustrated in Fig. 5, the invention provides automatically and effectively for squaring of the side frames with respect to the bolster. Whenever for any reason (as, for example, in rounding curves) one side frame tends to lead the opposite one the bolster wear plates are engaged by opposite corners of rockers 9. Thus, as shown in Fig. 5, the side frame A is out of squared relation with the bolster, the longitudinal axis of the bolster being designated X and that of the side frame being shown by line Y. A line perpendicular to line Y is shown at X', indicating in conjunction with line X the extent to which the side frame and bolster are out of squared relationship. It will be seen that the left hand wear plate 15 is engaged by the corner 9a of the adjacent rocker 9, while the right hand wear plate is engaged by corner 9b of its associated rocker. Said rockers, under the influence of the springs 11, thus exert a couple urging the return of the side frame into squared relation to the bolster.

Figure 6:
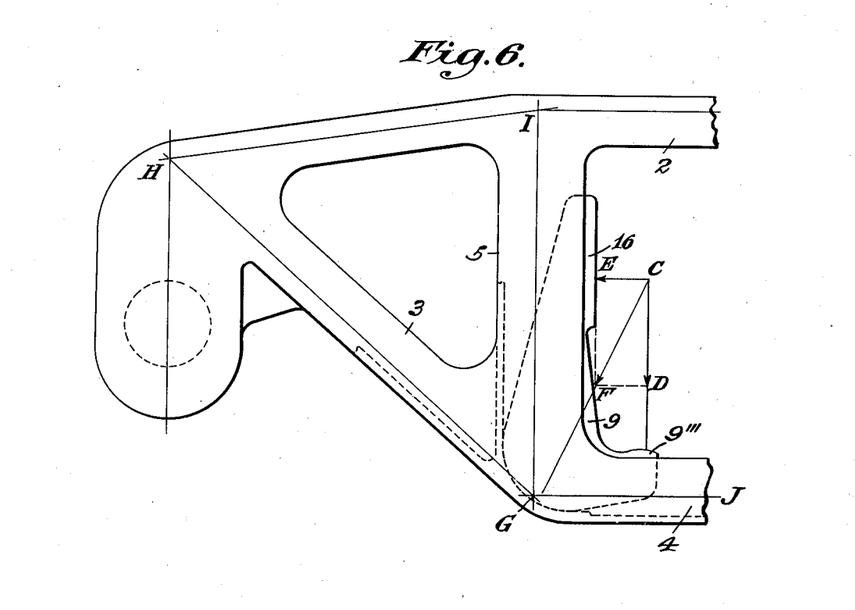
Fig. 6 is a diagrammatic elevational view illustrating the transmission of stresses through the bolster supporting springs to the side frame.

A further important feature of my invention resides in a novel and highly advantageous transmission of forces from the bolster to the side frame. Referring to Figure 6, there is illustrated the transmission of forces from the bolster to the side frame through one of the rockers 9. The force applied to the short arm of the rocker at projection 9''' is illustrated by the vector CD, and the reaction between the side of the bolster and surface 16 of the rocker by vector CE. The resultant of these forces is indicated by the line CF. It will be noted that the line of action of the resultant of the bolster forces passes closely adjacent to the point G. The latter lies at the intersection of lines HG, IG, and JG, which constitute the gravity axes respectively of the inclined tension member 3, the side frame column 5, and the horizontal tension portion 4. In other words, the line HG passes through the centers of gravity of successive cross sections of member 3 perpendicular to the longitudinal axis thereof; line IG passes through the centers of gravity of successive cross sections of column 5; and line JG through the centers of gravity of successive cross sections of tension portion 4. By virtue of the close proximity of the line of action of the resultant CF to the point G it will be seen that practically no bending moment is applied by the bolster to any of the members 3, 4, and 5, or to the compression member 2. The foregoing analysis applies equally to the transmission of forces from the bolster through the other rocker 9 in the side frame. This force transmission is in marked contrast to those prevailing in conventional side frames, wherein the resultant of the bolster weight passes through the central region of the horizontal tension portion of the side frame with consequent production of a decided beam action involving powerful secondary bending stresses tending to distort said horizontal tension portion together with the tension and compression members and the side frame columns. The direction of the resultant of the bolster stresses in my construction above described may be varied by changing the relative lengths of the arms of the rocker 9.

Owing to the substantial elimination of bending moments as above described, I am enabled to materially reduce the cross-sectional area of the various members and still maintain the stresses within them well below the A. R. A. maximum limiting specifications. Side frames employed with my invention may be of lighter construction with consequent reduction in weight in the car trucks. Also, due to the maintaining of the bolster and side frames in assembled relation through the rockers 9 in cooperation with the bolster lugs 6, 6 and 7, 7, the necessity of a spring plank is avoided and the latter can be omitted, with further saving in weight. For example, for a 40 ton car a saving of approximately 250 pounds in car truck weight may be effected through my invention, while for 50 ton cars a saving of about 470 pounds per car may be attained.

It may be further observed that the frictional pressure between the sides of the bolster and the rockers 9 increases with the extent of compression of the springs 11, the damping action of the friction system thus being proportional to the load upon said springs. Also the couple, hereinbefore described in connection with Fig. 5, which tends to restore the bolster and side frames into squared relation to each other, increases in magnitude with the load upon said springs.

Figure 7:
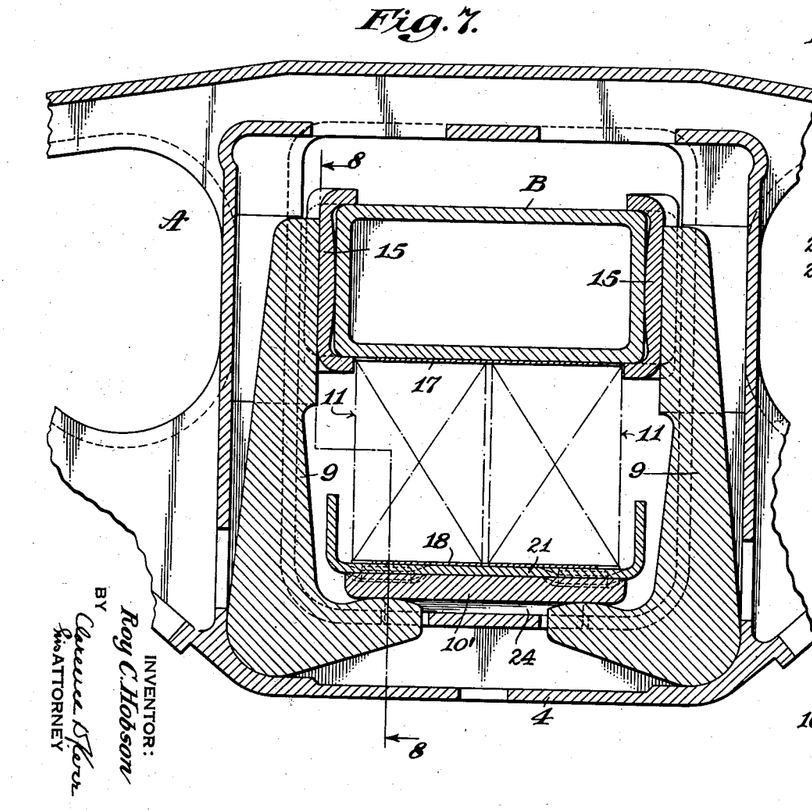
Fig. 7 is a fragmentary vertical longitudinal sectional view showing a modified form of my invention.
Figures 8, 9:
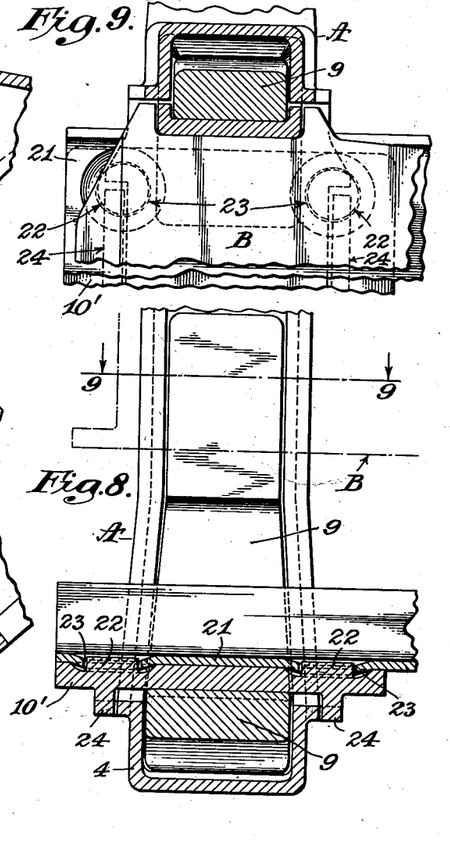
Fig. 8 is a transverse vertical sectional view on line 8—8 of Fig. 7.
Fig. 9 is a horizontal sectional view on line 9—9 of Fig. 8.

My invention may, if desired, be employed in conjunction with a spring plank, as illustrated in Figures 7, 8, and 9. In these views the side frame, bolster, rockers 9, and wear plates 15 are the same as in the preceding views. However, the bolster supporting springs 11, together with the spring plate 18, are mounted on a spring plank 21. The latter extends from one side frame of the truck to the other, but a description of the end portion thereof associated with the side frame A will suffice, it being understood that the opposite end of said spring plank coacts with the corresponding side frame in the same manner. The spring plank is engaged with the spring seat 10' through lugs 22 projecting upwardly from said seat through openings 23 punched in said plank. Depending flanges 24, 24 on the spring seat 10' overlap opposite sides of the horizontal tension portion 4 of the side frame, maintaining the spring seat and attached spring plank in assembled relation to the side frame.

Figure 10:
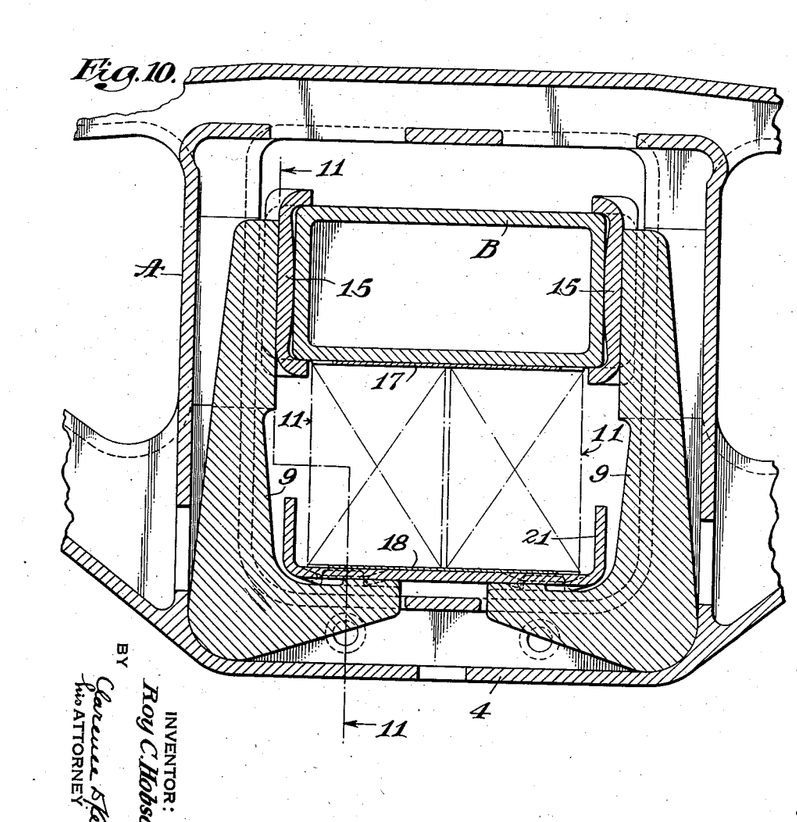
Fig. 10 is a fragmentary longitudinal sectional view showing a further modification of the invention.
Figure 11:
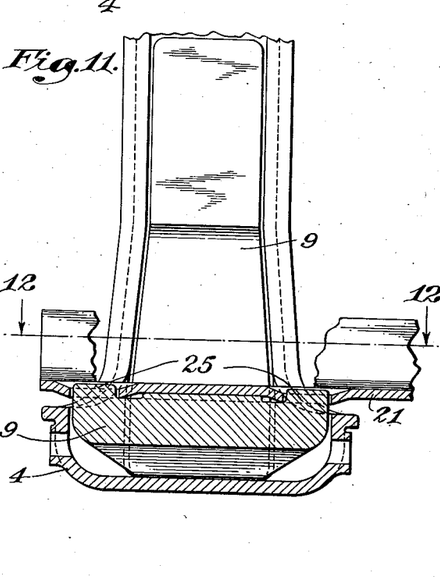
Fig. 11 is a transverse vertical sectional view on line 11—11 of Fig. 10.
Figure 12:
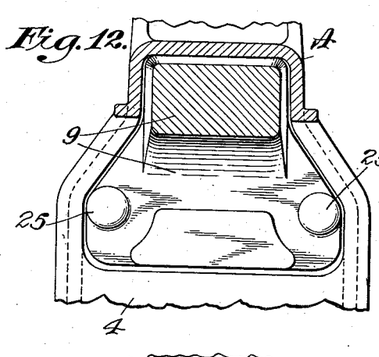
Fig. 12 is a horizontal section on line 12—12 of Fig. 11, but with the spring plank omitted.

In Figs. 10, 11, and 12 there is shown a further modification of my invention wherein the spring seat of Figs. 7, 8, and 9 is omitted, and the spring plank directly engages the rockers 9. Thus the spring plank 21 in Figs. 10, 11, and 12 bears directly on said rockers 9. While lugs or dowels might be provided on the side walls of the horizontal tension member 4 for engagement with holes in the spring plank to maintain the latter in assembled relation to the side frame, I have illustrated such dowels or lugs at 25 on the rockers themselves and extending through openings punched in said spring plank.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a car truck, a side frame, a bolster, springs beneath said bolster for supporting the same, and means on said side frame for supporting said springs and exerting frictional pressure against the sides of said bolster under the influence of said springs.

2. In a car truck, a side frame, a bolster, springs supported by said side frame beneath said bolster for supporting the latter, and snubbing means on said side frame for generating friction in conjunction with the sides of said bolster under the pressure of said springs.

3. In a car truck, a side frame, a bolster, a pair of rocker members on said side frame, and means comprising bolster supporting springs carried by said members for causing said members to exert frictional pressure against the sides of said bolster.

4. In a car truck, a side frame, a bolster, springs beneath said bolster for supporting the same, and snubbing means for said springs comprising a pair of rocker members on said side frame, said rocker members having horizontal arms extending under said springs and vertical arms forced by said springs to exert pressure against the sides of said bolster.

5. In a car truck, a side frame, a bolster, springs beneath said bolster for supporting the same, a pair of rocker members each having a horizontal arm and a vertical arm and pivotally mounted intermediate its ends on said side frame, said horizontal arms receiving forces from the bolster through said springs and said vertical arms transmitting pressure to the sides of said bolster.

6. In a car truck, a side frame comprising an upper compression member, a lower tension member, and columns connecting said members and providing a bolster receiving opening therebetween; a bolster extending into said opening, spring means underlying said bolster for supporting the same, a pair of rocker elements each bearing against said side frame in an end portion of said tension member, each rocker having an arm receiving forces from said bolster through said spring means and a vertical arm exerting pressure against a side of said bolster, the direction of the resultant of the forces applied by the bolster to each rocker passing through the region adjacent a point at the intersection of the gravity axis of the tension member and the gravity axis of the corresponding column.

7. In a car truck, a side frame comprising an upper compression member, a horizontal tension member, and columns connecting said members and providing a bolster receiving opening therebetween; a bolster extending into said opening; spring means beneath said bolster for supporting the same; and means interposed between said spring means, the sides of said bolster, and said tension member for causing the resultants of the bolster forces to extend along lines passing through the respective end portions of said tension member adjacent the bottoms of the respective columns.

8. In a car truck, a side frame comprising an upper compression member, a lower tension member, and columns connecting said members and providing a bolster receiving opening therebetween; a bolster extending into said opening; spring means below said bolster for supporting the same; said tension member having curved portions below the respective columns; a pair of rocker members each having a horizontal arm, a vertical arm, and an intermediate curved portion seated in a corresponding one of the curved portions of said tension portion, the horizontal arm of each rocker extending under said spring means for receiving forces therefrom, and the vertical arm of each rocker projecting upwardly within a corresponding one of said columns and extending inwardly beyond said column into position for applying pressure to a side of said bolster.

9. In a car truck, a side frame comprising an upper compression member, a lower tension member, and columns connecting said members and providing a bolster receiving opening therebetween; a bolster extending into said opening; spring means below said bolster for supporting the same; a pair of rocker members each pivotally mounted in a corresponding end portion of said tension member, each rocker member having a horizontal arm underlying said spring means for receiving forces therefrom, and each rocker member also having a vertical arm projecting upwardly within a corresponding one of said columns and extending inwardly beyond said column into position for applying pressure to a side of said bolster.

10. In a car truck, a side frame comprising an upper compression member, a lower tension member, columns connecting said members and providing a bolster receiving opening therebetween and inclined tension members extending from opposite ends of said lower tension member to opposite end portions of said compression member, said inclined tension members having bottom walls merging with the end portion of the bottom wall of said lower tension member, and said columns each having a vertical wall extending downwardly and merging with the bottom wall of an inclined tension member adjacent an end portion of said lower tension member, the end portions of the bottom wall of said lower tension member being curved; a bolster extending into said opening; spring means beneath said bolster for supporting the same; a pair of rocker members each having a curved portion seated in a corresponding curved end portion of said lower tension member, each rocker member having an arm extending beneath said spring means for receiving forces therefrom and also having an arm projecting upwardly within a corresponding column and extending inwardly beyond said column into position for applying pressure to a side of said bolster.

11. In a car truck, a side frame comprising an upper compression member, a horizontal tension member, and columns connecting said members and providing a bolster receiving opening therebetween, said columns each comprising side walls and a back wall merging into said tension member, a bolster extending into said opening, vertically disposed spring means for supporting said bolster, and means cooperating with said spring means for transmitting forces obliquely from the bolster to the side frame at points adjacent the junctions of said tension member and said columns.

12. In a car truck, a side frame comprising an upper compression member, a lower tension member, and columns connecting said members and providing a bolster receiving opening therebetween, a bolster extending into said opening, vertically disposed spring means for supporting said bolster, and means cooperating with said spring means for transmitting stresses obliquely from the bolster to the side frame at points in the end portions of said tension member.

13. In a car truck, a side frame comprising an upper compression member, a lower tension member, columns connecting said members and providing a bolster receiving opening therebetween, inclined tension members extending from opposite ends of said lower tension member to opposite ends of said compression member, a bolster extending into said opening, spring means beneath said bolster for supporting the same, and means cooperating with said spring means for transmitting stresses obliquely from said bolster to said side frame adjacent the intersections of the gravity axes of said tension members and columns.

14. In a car truck, a side frame, a bolster, springs beneath said bolster for supporting the same, a member on which said springs are seated, a pair of rocker elements having portions underlying said member and supporting the latter, said rocker elements being pivotally mounted on said side frame and having portions extending into position for applying pressure to the sides of the bolster under the influence of said springs.

15. In a car truck, a side frame, a bolster, spring means beneath said bolster for supporting the same, a spring seating member on which said spring means is mounted, a pair of rocker elements each comprising an intermediate curved portion fulcrumed on a correspondingly curved portion of the side frame, each rocker element also comprising a portion underlying and supporting said spring seating member, and a vertically extending portion for transmitting pressure to a side of the bolster.

16. In a car truck, a side frame comprising an upper compression member, a lower tension member and columns connecting said member and providing a bolster receiving opening therebetween, a bolster extending into said opening, spring means underlying said bolster for supporting the same, spring seating means on which said spring means is mounted, rocker means mounted on said side frame for supporting said seating means and transmitting pressure to the sides of the bolster, said lower tension member comprising a bottom wall and upwardly extending side walls having a web extending thereacross, said spring seating member having projections extending downwardly therefrom on opposite sides of said web.

17. In a car truck, a side frame, a bolster, spring means supported by said side frame below said bolster for supporting the latter, and means comprising rocker elements cooperating with said spring means and exerting pressure upon opposite sides of said bolster for applying a couple to said bolster to restore the side frame and bolster into squared relationship upon departure therefrom.

18. In a car truck, a side frame, a bolster having an end portion projecting into said side frame, said end portion of said bolster having pairs of lugs on opposite sides thereof, spring means beneath said bolster for supporting the same, and means comprising rocker elements mounted in said side frame and having portions cooperating with said lugs for maintaining the bolster and side frame in assembled relation, said rockers also having portions underlying said spring means.

19. In a car truck, a side frame, a bolster having an end portion extending into said side frame, said end portion having spaced lugs on each side thereof, a pair of plates carried by said bolster and extending between the respective pairs of lugs, spring means on said side frame for supporting said bolster and rocker elements receiving stresses from the bolster through said spring means and engaging said plates.

20. A car truck, a side frame, a bolster, spring means beneath said bolster for supporting the same, a spring plank on which said spring means is mounted, and means comprising a pair of elements fulcrumed on said side frame for supporting said spring plank.

21. A car truck, a side frame, a bolster, spring means beneath said bolster for supporting the same, a spring plank on which said spring means is mounted, and means comprising a pair of elements pivotally mounted in said side frame for supporting said spring plank, said elements having portions underlying said spring plank and portions overlying opposite sides of the bolster for applying pressure thereto.

22. In a car truck, a side frame, a bolster, spring means beneath said bolster for supporting the same, a spring plank on which said spring means is mounted, a member underlying said spring plank, interengaging means between said spring plank and said member, a pair of elements pivotally mounted in the side frame, and having portions underlying said member for supporting the same, said elements having portions extending along opposite sides of the bolster for applying pressure thereto.

23. A car truck, a side frame, a bolster, spring means beneath said bolster for supporting the same, a spring plank on which said spring means is mounted, means comprising a pair of elements pivotally mounted in said side frame for supporting said spring plank, said elements having portions underlying said spring plank and portions overlying opposite sides of the bolster for applying pressure thereto, and means for maintaining said spring plank in assembled relation to said side frame.

24. In a car truck, a side frame, a bolster, spring means beneath said bolster for supporting the same, a spring plank on which said spring means is mounted, a member underlying said spring plank, interengaging means between said spring plank and said member, a pair of elements pivotally mounted in the side frame, and having portions underlying said member for supporting the same, said elements having portions extending along opposite sides of the bolster for applying pressure thereto, and interengaging means between said spring plank and said member, said member having projections overlapping a portion of the side frame for maintaining said member in a given relation to said side frame.

25. In a car truck, a side frame, a bolster, springs supported by said side frame directly beneath said bolster for supporting the latter, and means on said side frame for exerting frictional pressure against the sides of said bolster under the influence of said springs, said pressure being proportional to the bolster load upon said springs.

26. In a car truck, a side frame, a bolster, spring means directly below said bolster for supporting the same, and means cooperating with said spring means and exerting pressure upon opposite sides of said bolster for applying a couple to said bolster to restore the side frame and bolster into square relationship upon departure therefrom.

27. In a car truck, a side frame, a bolster, spring means directly below said bolster for supporting the same, and means cooperating with said spring means and exerting pressure upon opposite sides of said bolster for applying a couple to said bolster to restore the side frame and bolster into square relationship upon departure therefrom, said pressure being proportional to the bolster load upon said spring means.

28. In a car truck, a side frame, a bolster, spring means below said bolster for supporting the same, and means comprising rocker elements cooperating with said spring means and exerting pressure upon opposite sides of said bolster for applying a couple to said bolster to restore the side frame and bolster into squared relationship upon departure therefrom, said pressure being proportional to the bolster load upon said spring means.

29. In a car truck assembly, a bolster, side frames associated with said bolster at the ends thereof, vertically disposed springs supporting said bolster on said side frames, and means between said springs and said side frames and cooperating with the bolster to compress at least one of said springs when said bolster is moved longitudinally with respect to said side frames.

30. In a car truck assembly, a bolster, side frames associated with said bolster at the ends thereof, vertically disposed springs supporting said bolster on said side frames, and means between said springs and said side frames and cooperating with the bolster to compress at least one of said springs an amount proportional to the degree of movement of said bolster when the latter is moved longitudinally with respect to said side frames.

31. A car truck comprising a bolster, a side frame associated with one end of said bolster, rocker arms pivotally supported on said side frame, springs mounted on substantially horizontal portions of said rocker arms, serving to support the end portion of said bolster, and downwardly extending friction surfaces interlocked with said bolster and engaging upwardly extending portions of said rocker arms having friction surfaces thereon, said rocker arms being pivotally supported at points near the juncture of said substantially horizontal and said upwardly extending portions.

32. In a car truck assembly, a bolster, side frames associated with said bolster at the ends thereof, vertically disposed springs supporting said bolster in said side frames, and rocker arms cooperating with said springs and bolster and reacting with said side frames to restore said bolster to a central position after movement thereof longitudinally of said side frames by a force proportional to the load on said side frames and the extent of said longitudinal movement.

ROY C. HOBSON.